US007463878B2

(12) United States Patent
Kumar et al.

(10) Patent No.: US 7,463,878 B2
(45) Date of Patent: Dec. 9, 2008

(54) REAL-TIME INTERCONNECT BILLING SYSTEM AND METHOD OF USE

(75) Inventors: G. V. Kumar, Hyderabad (IN); Mohan S. Kumar, Hyderabad (IN)

(73) Assignee: Megasoft Consultants, Inc., Herndon, VA (US)

(*) Notice: Subject to any disclaimer, the term of this patent is extended or adjusted under 35 U.S.C. 154(b) by 86 days.

(21) Appl. No.: 11/024,972

(22) Filed: Dec. 30, 2004

(65) Prior Publication Data

US 2005/0181796 A1    Aug. 18, 2005

Related U.S. Application Data

(60) Provisional application No. 60/533,148, filed on Dec. 31, 2003.

(51) Int. Cl.
 *H04M 11/00* (2006.01)
(52) U.S. Cl. .................. 455/406; 455/405; 455/408; 379/112.01; 705/34
(58) Field of Classification Search ............... 455/406, 455/405, 408, 407, 432.1; 379/114.3, 112.1, 379/111, 112.01; 705/34
See application file for complete search history.

(56) References Cited

U.S. PATENT DOCUMENTS

| | | | |
|---|---|---|---|
| 6,195,543 B1 * | 2/2001 | Granberg | 455/407 |
| 6,226,364 B1 * | 5/2001 | O'Neil | 379/114.2 |
| 6,377,938 B1 * | 4/2002 | Block et al. | 705/32 |
| 6,779,030 B1 * | 8/2004 | Dugan et al. | 709/223 |
| 6,947,723 B1 * | 9/2005 | Gurnani et al. | 455/406 |
| 2004/0133487 A1 * | 7/2004 | Hanagan et al. | 705/34 |
| 2004/0192297 A1 * | 9/2004 | Erskine et al. | 455/432.1 |
| 2006/0045245 A1 * | 3/2006 | Aaron et al. | 379/111 |
| 2006/0239416 A1 * | 10/2006 | Richardson | 379/1.01 |

* cited by examiner

*Primary Examiner*—Danh C Le
(74) *Attorney, Agent, or Firm*—Weingarten, Schurgin, Gagnebin & Lebovici LLP

(57) ABSTRACT

A system and method of real-time interconnect billing to facilitate invoicing and reconciliation between interconnected communication and service providers. The fully customizable, scalable, and network-based system rates and monitors costs, incorporates agreements between interconnected providers, invoices, bills, and reconciles to establish an accurate and cost-effective accounting of provider revenues and costs. The system is able to communicate with devices, networks, and interconnect providers to obtain, provide and exchange billing information and payments. The system updates subscriber accounts and alerts the home provider, subscribers, interconnect providers and users of these updates.

20 Claims, 7 Drawing Sheets

Solution Architecture

Invoicing

Reconciling Invoices Rec'd

REAL-TIME INTERCONNECT BILLING SYSTEM AND METHOD OF USE

This application is related to Applicants' copending U.S. Nonprovisional patent application Ser. No. 10/850,561 of G. V. Kumar and G. V. R. Nagaraju, titled "System for A Wireless Intelligent Services Engine" filed May 21, 2004, Nonprovisional patent application Ser. No. 10/996,072 of G. V. Kumar and S. Mohan Kumar, titled "Method and System for Accessing Wireless Networks" filed Nov. 24, 2004, and U.S. Provisional Patent Application Ser. No. 60/533,148 of G. V. Kumar and S. Mohan Kumar titled "Realtime Interconnect Billing System and Method of Use" filed Dec. 31, 2003. The entirety of these patent applications is incorporated herein by reference.

BACKGROUND OF THE INVENTION

1. Field of the Invention

The present invention relates to a method and system for a network-based, real-time interconnect billing and reconciliation between Wireless/Wireline network and other service providers.

2. Description of the Related Art

The telecommunications technology industry, which includes wireless and wireline communication devices, services, and networks, has witnessed a rapid increase in the number of network/service providers (referred to interchangeably herein as "network operators," "communication and information carrier network providers," "CCN providers" or "providers" or "service providers") as well as subscribers, signal traffic, and competitive tariff structures. As used herein, wireline communications devices, services, and networks are interchangeable with wireless communications devices, services and networksunless explicitly distinguished herein. Increasingly, separate and/or independent providers and other pertinent entities work jointly (commonly referred to herein as "interconnection" or "interconnect") to provide comprehensive services to their clientele.

A communication and information carrier network (interchangeably referred to herein as a "CCN" or "Network"), such as, for example, a wireless or wireline phone network, typically serves numerous users. Users are provided access to the CCN using communication devices (interchangeably referred to herein as "devices"), such as telephones, to exchange information or otherwise communicate. The CCN to which the user has a subscription or contractual obligation is known generally as a "home CCN" (interchangeably referred to herein as a "home network" and/or a "home CCN provider"). Accordingly, a subscriber is a user of a home CCN.

The subscriber operates the device (e.g., by turning it "on" or by dialing a telephone number on a telephone or by accessing information on a telephone) to access various services provided by either CCN or any other service provider using CCN network infrastructure to deliver their service to CCN subscribers or users (hereinafter collectively or interchangeably referred to as CCN).

When the subscriber operates the communication device (e.g., by turning it "on" or by dialing a telephone number on a telephone), the subscriber instructs the communication device to transmit signals to a second communication device, also known as an "end user," or to one or more CCN control centers.

Each CCN has a specified geographic area of operation, generally known as "range" or "home area." When the subscriber operates the communication device within the range of the home CCN (e.g., the subscriber is located in the home area), the subscriber's signals are carried or transmitted to the end user or a signal receiver of the home CCN or service provider via the home CCN. The home CCN provider conducts and controls each aspect of the communication, also known as "end-to-end processing." This end-to-end processing includes handling, routing, and delivering the call, as well as rating and billing the subscriber accordingly. However, the home CCN provider can only engage in end-to-end processing when the service request is placed and ranges entirely within the home CCN or the services provided by the home CCN.

It is possible, however, that the subscriber cannot access the home CCN, for example, in the following circumstances: when the subscriber operates the communication device outside the home CCN area, when the home CCN is out of service, when the home CCN communication signal strength is less than that of other CCNs, or when the home CCN is otherwise unavailable. Due to the generally limited range of home CCNs, the scope of services provided by the home CCN provider would inevitably be limited if subscribers were only able to access the services of the home CCN.

Conventional technology allows subscribers of a home CCN to access other interconnected, technologically compatible and available CCNs. One aspect of the use of the interconnected CCN (i.e., non-home CCN) by the subscriber is generally known in the art as "roaming (hereinafter interchangeably referred to as 'Inter Connected Service Delivery')." Accordingly, the interconnected CCN is generally known as a "roaming CCN or a "roaming Network." A "roaming subscriber" or a "user" generally refers to a subscriber of a home CCN who cannot access the home CCN for whatever reason and uses or accesses the services of a roaming CCN.

Conventional roaming technology, however, includes certain drawbacks that prevent seamless and comprehensive interconnection, thereby limiting the applicability of roaming CCNs, the usage of roaming CCNs by subscribers, and, in turn, the profitability of the home CCN provider. Generally, roaming technology has been limited to allowing roaming subscribers to place telephone calls on roaming CCNs.

Interconnection between CCN providers, however, often exceeds the demands of simply facilitating telephone calls. Interconnection in the communication technology industry has seen increasing complexity with regard to inter-CCN provider agreements, data exchange and invoicing processes. Accordingly, the needs of interconnected providers typically include comprehensive roaming/interconnection management (which includes facilitating communication as well as monitoring the stability and functions of the interconnected CCNs) and assessment of costs and benefits of interconnection.

Increasingly, a significant aspect of interconnection involves managing and reconciling the responsibilities and financial accounts of each provider party to the interconnection. Generally, charges incurred or generated through interconnection between CCN or other service providers, which can be generated, for example, through access and use of a roaming CCN or use of other services from a roaming CCN provider, account for a substantial percentage of a provider's revenue and/or costs. Consequently, mismanagement of interconnect charges and related billing may lead to significant detriments, such as lost revenue and increased costs, resulting in the provider being unable to account for such incurred or generated charges. For instance, providers operate on inflexible billing systems which often produce inaccurate invoices, resulting in significant loss of revenue. It is critically important, therefore, for providers to accurately measure and account for interconnect billing and invoicing to at least manage revenue streams and to potentially increase profitability.

As inaccurate interconnect billing can significantly impact a provider's profitability, providers require accurate accounting and assessment of the network-related charges incurred, generated, owed, paid, or collected (collectively known as "network revenues/costs" or "charges") with respect to the home CCN and interconnected CCNs. Thus, providers require a flexible, robust, efficient and accurate interconnect billing system.

An interconnect billing system required to accomplish the above must possess many features to comprehensively assess and account for network revenues/costs. In particular, there is an unmet need in the prior art for an interconnect billing system that is able to: 1) seamlessly rate interconnect events accurately on a real-time basis; 2) seamlessly control incoming and outgoing invoices; 3) efficiently monitor interconnect costs; 4) effectively handle partnerships and agreements; 5) handle claims quickly and efficiently; 6) seamlessly understand and adapt to an increasing volume of interconnect services and demands.

There further remains an unmet need for an interconnect billing system to flexibly, robustly, efficiently and accurately assess and account for bills related to interconnection services. There also remains an unmet need for an interconnect billing system that is seamlessly integrated and useable by interconnected service providers.

SUMMARY OF THE INVENTION

The present invention includes an innovative solution for assessing and accounting revenues/costs for networks, resulting from interconnection between providers. The method and system of the present invention (herein interchangeably referred to as the "system") provides an automated, real-time interconnect billing component, which is flexible, robust, high-performance, fully scaleable and fully customizable. The system can monitor and assess interconnection accounts; if required, correct inaccuracies such as excessive interconnect charges and inaccurate bills; and obtain and process payment, as necessary.

In one embodiment, the system is useful and applicable to multiple phases of the interconnection (also referred to herein as the "lifecycle of interconnect billing"), including the incorporation of the initial business agreement, management of the business agreement, rating, invoicing, payments and reconciliation thereof. The system enables real-time interconnect billing, accurate invoicing and reconciliation according to one embodiment of the invention. The system allows providers to avoid or reduce accounting expenses and commitment resulting from accounting inefficiencies, thereby providing providers using the system economic leverage and financial advantages.

A second embodiment of the system provides the first truly real-time, seamless, automated system for interconnect billing. In particular, the system provides at least: 1) automated business logic driven routing (e.g., least-cost routing); 2) hot billing; 3) notifications (e.g., smart alerts); 4) real-time interconnect control; 5) multi-tier reconciliation; 6) real-time secured access to partnered communication operators for multi-dimensional reconciliation; and 7) platform management using network management tools.

Additional advantages and novel features of the invention will be set forth in part in the description that follows, and, in part, will become more apparent to those skilled in the art upon examination of the following or upon learning by practice of the invention.

Figure 1:
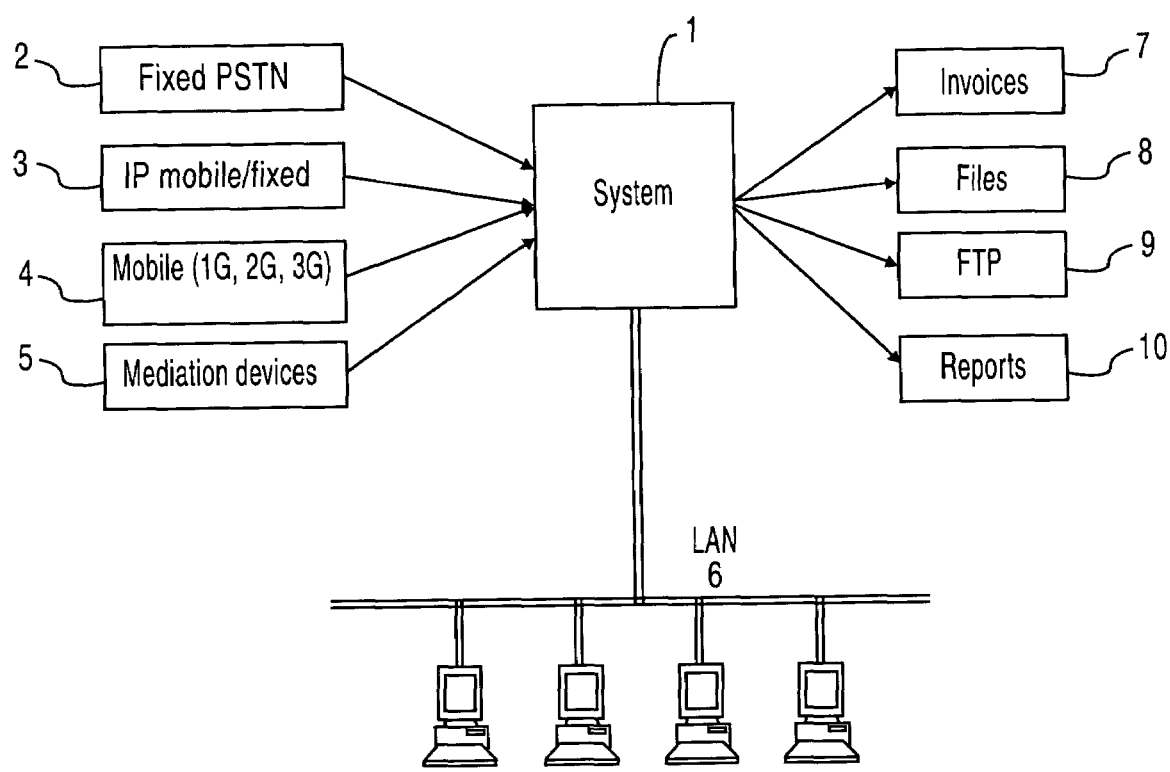
FIG. 1 provides a representative flow diagram of the system and deployment of the present invention in accordance with one embodiment of the present invention.

Other features of the present invention will become apparent from the following detailed description considered in connection with the accompanying drawings which disclose multiple embodiments of the present invention. It should be understood, however, that the figures are designed for the purpose of illustration only and not as a definition of the limits of the invention. Additional advantages and novel features of the invention will also become apparent to those skilled in the art upon examination of the following or upon learning by practice of the invention.

DETAILED DESCRIPTION OF THE INVENTION

The present invention provides a network-based system and method of use for real-time interconnect billing and invoicing. The system of the present invention increases accuracy, reduces processing times, synchronizes invoicing and/or billing among one or more interconnected service providers, increases the seamlessness of the delivery and transmittal of the billing information and increases the availability of the billing information. The system calculates true costs and accordingly processes and verifies invoices.

One embodiment of the present invention is flexible, fully scaleable, fully customizable, and applicable with general industry standards. The present invention is a network-based solution of interconnect billing. By "network-based," it is meant that the present invention is implemented network-wide without hardware modifications on particular devices such as telephones. Accordingly, as understood by one skilled in the art, the system implementation of the present invention is transparent to the subscriber.

In another embodiment of the present invention, the system assesses and accounts for the entire interconnect billing life cycle. In one variation, the system allows the providers to generate accurate and real-time invoices, facilitate billing (e.g., hot billing and cyclical billing), conduct automated multi-tiered reconciliation, automate business logic driven routing, and communicate with users, third-party entities (e.g., interconnect partners and outsourced accountants), applications, and/or hardware. The system, as a result, allows the provider to increase its revenue by making the accounting of services, particularly roaming services, more timely, efficient and reliable.

For the purposes of this application, the term "business practices" includes any aspect of the relationship between the home CCN provider and its subscribers, non-subscribers, other CCN providers and third-party entities. For example, business practices include business agreements (e.g., rating agreements and reciprocal traffic agreements), definitions and listings of products and services, incentive programs (e.g., loyalty incentives), and billing and accounting principles. It should be understood by one skilled in the art that business practices may include any aspect of the CCN provider that affects revenue and market status. For the purpose of this application, the term "partner" is generally interchangeable with the term "provider" when it suggests interconnect providers having a business relationship with the home CCN provider.

In another embodiment of the present invention, the deployment and integration of the system may involve one or more of the following functions: invoicing network usage, including real-time invoicing; billing users and/or providers; reconciling outstanding invoices/bills; communicating with providers, hardware, software and users; generating accounting reports; notifying users and/or providers of invoicing/billing issues; auditing accounting practices; determining and correcting billing errors; rating; directing users to least cost alternatives; managing, reviewing and updating business practices; monitoring network activity; identifying users of the network; assessing records (e.g., call detail records (CDR), call data records (CDR), and event data records (EDR)); accessing subscriber accounts; synchronizing billing; issuing and transmitting billing and payment; instituting revenue streams and revenue thresholds; and managing platforms using network applications, such as OpenView® by Hewlett Packard of Palo Alto, Calif., USA.

In the embodiment of the present invention as presented in FIG. 1, the system 1 of the present invention is linked with the infrastructure of the home CCN provider. For example, the system 1 is implemented on a local area network (LAN). The system 1 is communicable with, for example, one or more fixed public switched telephone networks (PSTN) 2, one or more mobile or fixed Internet Protocol-based networks 3, one or more mobile networks 4 (e.g., first generation (1G), second generation (2G), and third generation (3G)) and one or more mediation devices 5. Generally, the system 1 receives information from, or is contacted by, these devices and networks 2-5. The system 1 produces or generates invoices 7, files 8, and reports 10, and facilitates further communication (e.g., via file transfer protocol (FTP) 9).

The system is typically implemented in conjunction with the home CCN provider and at least one of: a roaming CCN provider; a signaling transfer point (STP) and a signaling gateway. Communication is facilitated using any communication link, including industry standard protocols such as the common channel signaling system no. 7 ("SS7") or the common channel signaling system no. 8 ("SS8"); transmission control protocol (TCP)/internet protocol (IP); or other signaling protocols that are currently known or will be known in the art. In one embodiment, the present invention is integrated with, or connected to, the home CCN hardware, software or any other processing device known in the art for receiving and/or processing of roaming signals, such as a switching center (herein after interchangeably referred to as MSC).

Figure 2:
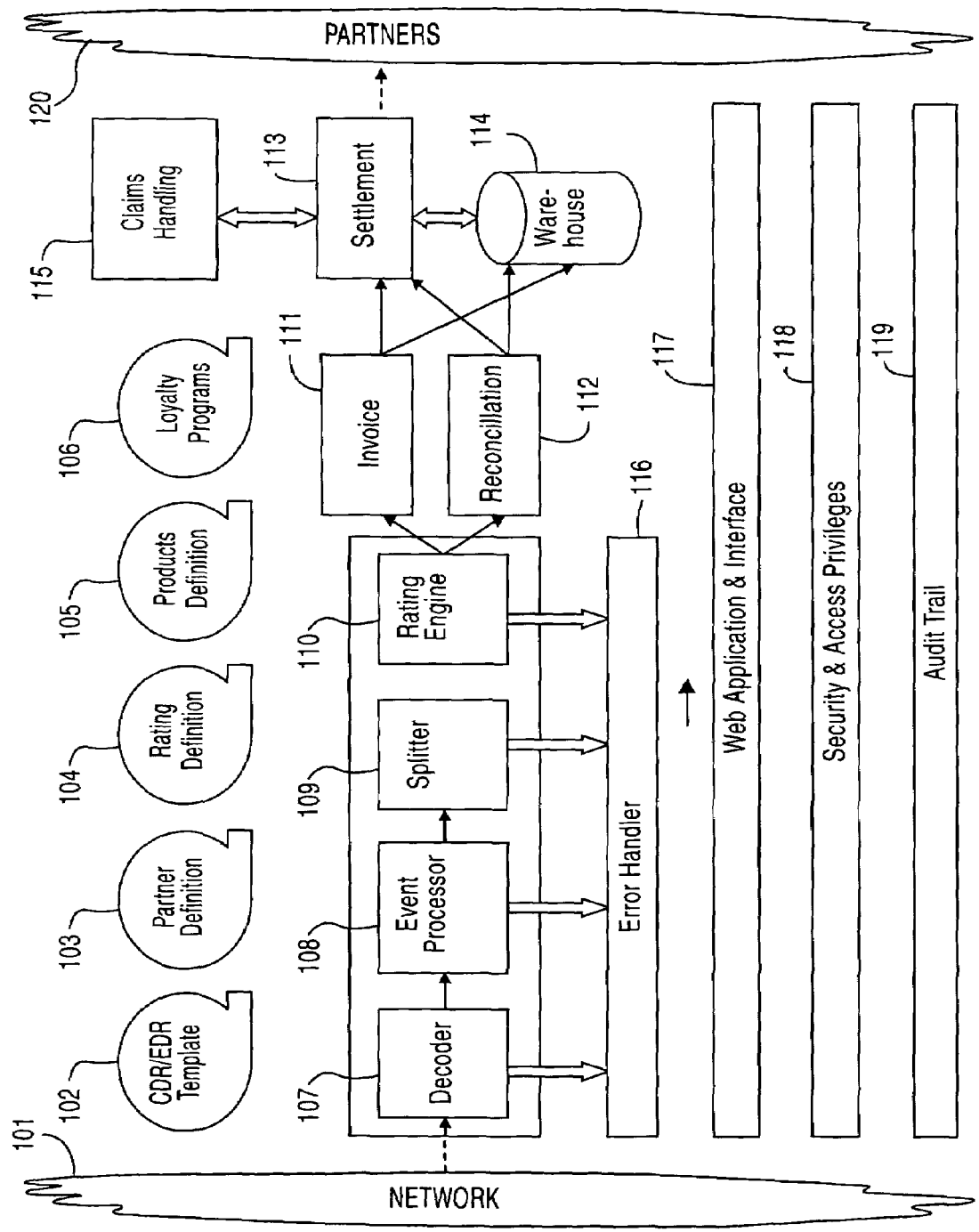
FIG. 2 provides a diagram of the system functionalities in accordance with an embodiment of the present invention.

FIG. 2 illustrates a diagram of the functionalities of the system 100 in accordance with another embodiment of the present invention. The system 100 communicates with the network 101 and other providers (i.e., partners) 120. The system 100 manages, maintains, reviews and assesses the business practices of the home CCN provider. For example, the business practices include CDR/EDR templates 102, partner definitions 103 (e.g., business agreements and affiliations), rating definitions 104, product and service definitions 105, and programs 106 (e.g., loyalty programs). The business practices 102-106 form a basis for the system 100 logic and reference data for processing billing and invoicing. In one variation, the intelligent system 100 can seamlessly implement rate and charging changes, incorporate updated or new reference data, and update agreements and implement changes therein.

When the system 100 communicates with the network 101, the communication signal is decoded and processed using a decoder 107. The decoded signal is read through an event processor 108 to identify the events that have been or should be triggered to process the communication signal. A splitter 109, which splits the signal and events into related subsequent processors in the solution, will direct the signal to subsequent processors as defined by the event processor. In the event that the decoder 107, event processor 108, and splitter 109 receive an error or cannot process the signal, the signal is sent to an error handler component 116.

The signal from the network 101 is also processed through a rating engine 110 in one variation. The rating engine 110 calculates the value of network usage which is processed by the accounting functionalities of the present invention. In one variation, the rating engine directs the information from the signal to invoice module 111 and/or reconciliation module 112. In both modules, generally, the information is processed for settlement 113 or transmitted to a holding area such as a warehouse 114, where it can remain accessible and ultimately be directed to settlement 113 at a later time. To settle outstanding bills, the system 100 processes the claims in claim handling 115, which directly interfaces with subscriber accounts maintained by the home CCN. Alternatively, the settlement 113 is conducted with interconnect partners 120 and their users.

The system 100 has other modules to address the accounting needs of the provider. In one variation, the system 100 includes a web application and interface 117 which allows manual input or review of the accounting protocol. In another variation, the system 100 is also equipped with security and access privileges 118 to protect the system 100 from unauthorized use. One other variation of the present invention is an audit trial feature 119, which allows the system 100 to evaluate accounting performance and to reconfigure, as necessary, to optimize performance.

Figure 4:
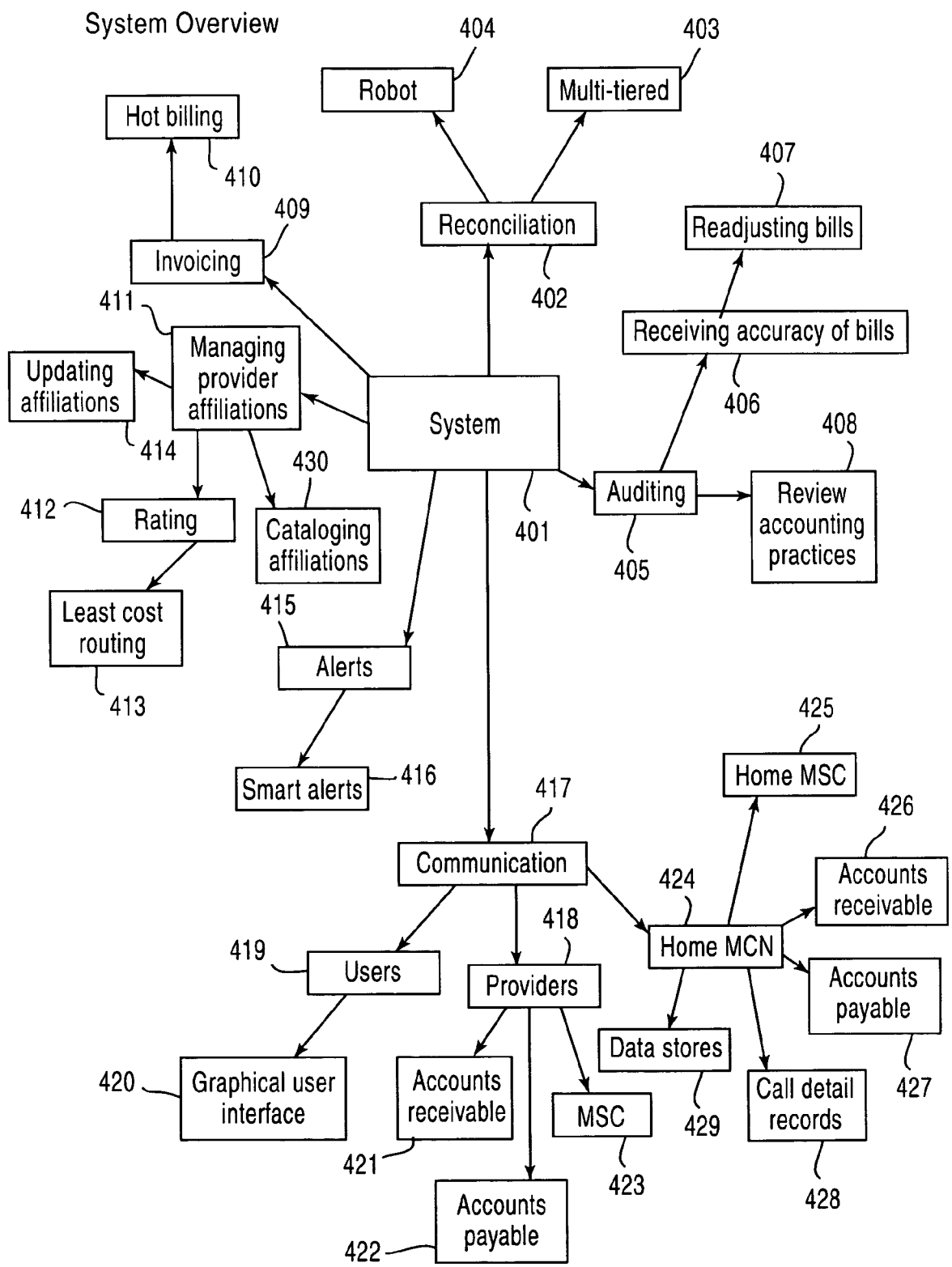
FIG. 4 illustrates an exemplary schematic of the system in accordance with an embodiment of the present invention.

As illustrated in FIG. 4, in accordance with yet another embodiment of the present invention, the functionalities of the system 401 generally include sending alerts 415, communicating 417, auditing 405, reconciling 402, invoicing 409 and managing 411.

In one variation, invoicing 409 and reconciliation 402 are considered the core operations of the interconnect system of the present invention. Invoicing 409, as used in the present application, incorporates a range of accounting practices, which includes itemizing and/or presenting purchases of services or usage and billing which involves collection of money requested in the invoices. The present invention is able to invoice network usage to subscribers, providers and non-subscribers (e.g., roaming users) via the providers, for example, in real-time. This real-time invoicing is known as "hot billing" 410. With respect to accurate, real-time invoices and hot billing 410, in one variation of the present invention, the system 401 interfaces with signalling units of partnering networks (e.g., via the MSC) and obtains Cell Data Records (CDRs) on a real-time basis. Invoicing for the obtained CDRs is performed, and a balance is updated for each interconnect provider. This feature makes the system 401 a truly real-time interconnect billing system. In another variation of the present invention, the system 401 is able to perform real-time invoicing 409, but billing for the accumulated invoice at a predetermined time.

Moreover, the system 401 of the present invention is able to reconcile outstanding accounts and debts/credits in its reconciliation module 402. Reconciliation 402 generally involves accounting for a network usage and transaction record and assessing the amount and duration of network usage in light of business practices (e.g., rating determinations). In one variation, the system 401 is able to conduct robot reconciliation 404 in which no manual input is required. One variation of the system's 401-robot reconciliation 404 is based on a sophisticated method that makes it fast, yet simple. The method continuously operates in the background without manual interaction, and this facilitates availability of information at a near online or real-time rate without additional expenses and manual labor. On enabling the robot reconciliation, the system will dynamically initiate background reconciliation of the accounts pertaining to interconnected CCNs.

In another variation, the system 403 is able to compare and verify numerous levels of data and capabilities to reconcile accounts. Reconciliation of this type is generally known as "multi-tiered reconciliation" 403. In the past, reconciliation was carried out on the called party, calling party number and on the time of the transaction. With the system 403, the CCN can define various transaction parameters and their hierarchy for reconciliation. For every transaction record, apart from Calling Party, Called Party and time of transaction, the amount and duration of interconnect communications are reconciled, with some pre-defined latency, as generally determined and known in the art. In a preferred variation, reconciliation is conducted in real-time. This would aid in reducing long settlement cycles between Interconnect CCNs and also provide real time reconciliation.

The system 401 is able to access and communicate 417 in one variation. The system 401 provides users with real-time billing information 419. Using an interface device, such as a graphical user interface (GUI) 420, available on a network, for example, the user can review the wireless bill, including those charges accrued through interconnect use. The system 401 is also able to alert 415 users of changes to an existing invoice or the generation of a new invoice.

In one variation, the system 401 can communicate with users using short messaging service (SMS). For example, in one variation, embodiments of the system 401 are equipped with a business alerts feature called Smart Alerts 416. Events can be configured based on configurable business logic which are generally known in the art. For example, when an event is triggered, the system 401 raises alarms to designated individuals through the SMS and/or via e-mail. For instance, the system 401 can set revenue thresholds for a particular partner, and upon satisfying the defined limits, the system 401 shall raise an alarm.

The system 401 is able to communicate with the home CCN 424 to obtain information to accurately and comprehensively invoice and reconcile subscriber and non-subscriber accounts. Accordingly, the system 401 can communicate with the home MSC 425, accounts receivable 426, accounts payable 427, call and event details 428 and one or more data stores 429.

In order to provide accurate and comprehensive invoices and bills to users, the system 401 accesses providers 418 via the MSC, for example, to obtain interconnect charges. Accordingly, in yet another variation, the system 417 is able to access the accounts receivable 421, accounts payable 422 and the MSC 423 of the roaming providers.

The system 401 allows access to reconciled records available on a network such as the Internet (also referred to herein as the "worldwide web" or the "web"), for example, through a secured web interface to the privileged, affiliated or partnered providers. Partners can access this information by supplying credentials (e.g., username and password) through an identification verification method (e.g., a secured socket layer ("SSL")) on the Internet. Ready access by partners in such a manner provides seamless operations and execution.

Another feature of the system 401 is to manage provider affiliations and business relationships 411. The system 401 catalogues the business practices with respect to each provider 430 and updates the scope of the affiliations 414 as determined by the home CCN provider. The system 401 also performs a rating function 412, whereby the system 401 calculates and determines options for business logic driven routing (e.g., least cost routing 413). In one variation, the system 401 can calculate bulk rating, rating milestones, discounts, and similar cost/pricing features as would be understood to one skilled in the art.

The system 401 is also able to conduct audits 405 of the accounting protocol of the home CCN provider. For example, the system 401 can evaluate accounting practices 408 and how bills and invoices are reconciled. Additionally, the system 401 provides intelligence to review the accuracy of outgoing and incoming bills 406 and to readjust the bills 407, as necessary.

In yet another variation, the system 401 offers a business logic driven routing, such as automated least cost routing 413, that optimizes routing decisions on a real-time basis. The system 401 is thus able to automate various complex tasks, and the system 401 allows simultaneous decision support capabilities. This automated least cost routing feature 413 manages and accounts for economical, technical (e.g., network traffic and capabilities) and business considerations without manual intervention.

Embodiments of the system 401 facilitate and assess numerous options for the least cost routes. This assessment is based, in part, in one variation, on an analysis conducted by the system 401 on reference data stored 429 or accessed by the system. This assessment and analysis is conducted in real-time. For example, the system 401 interfaces with the provider's network 418. The system 401 then compares data from different processes in the system 401 and determines optimal business performance, i.e. the lowest cost operator network for interconnection. The system then provides metrics that enable the provider to provide low cost services 413 and/or to benchmark and improve performance. A variation of the least cost routing feature and the selection of roaming providers is provided in Applicants' copending application U.S. Nonprovisional patent application Ser. No. 10/850,561 of G. V. Kumar and G. V. R. Nagaraju, titled "System for A Wireless Intelligent Services Engine" filed May 21, 2004.

Figure 5:
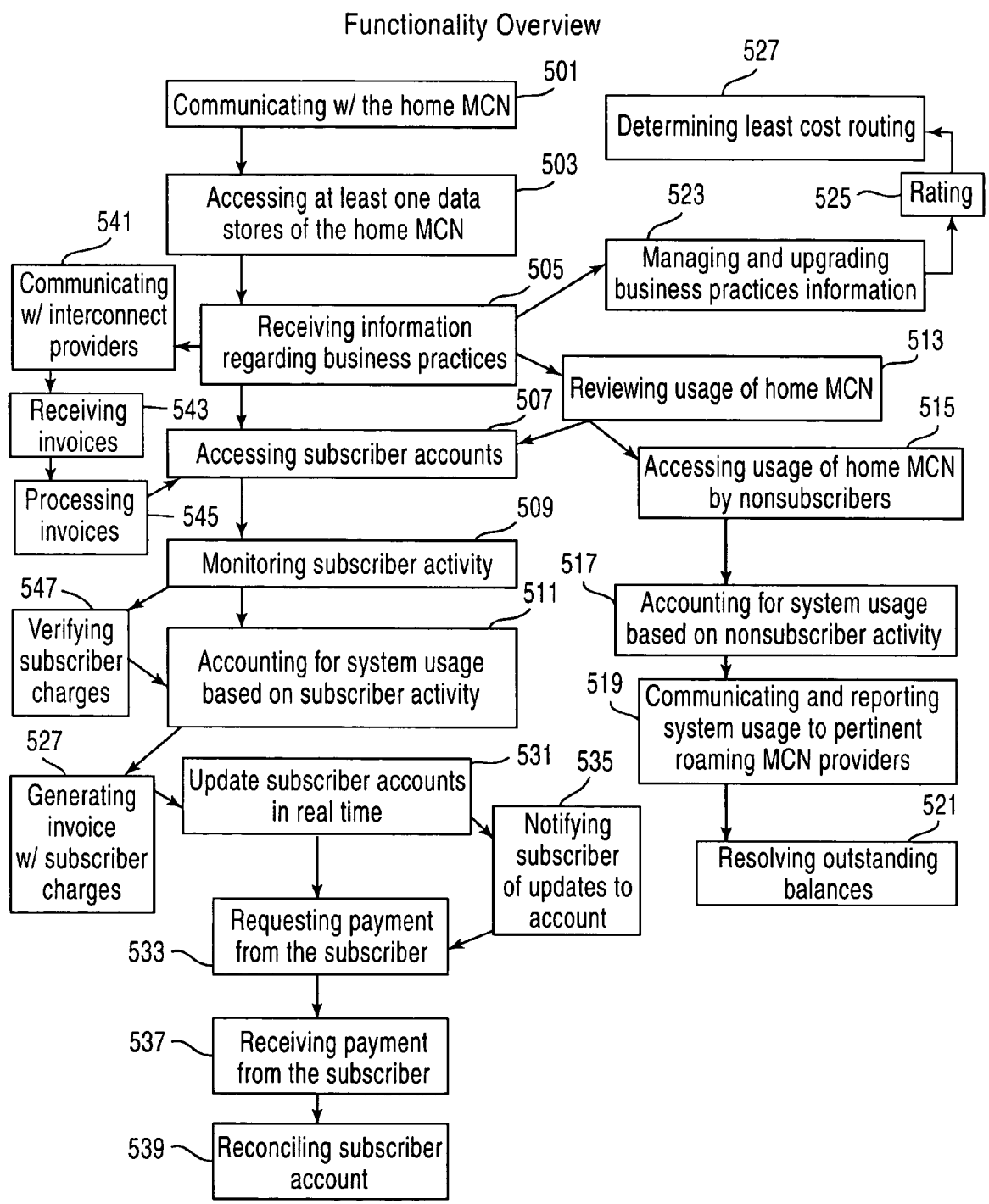
FIG. 5 presents an exemplary flow diagram of the system functionalities in accordance with an embodiment of the present invention.

FIG. 5 provides an exemplary flow diagram of the operation of the system of the present invention. The system initiates the billing process at step 501 by communicating with the home CCN. Generally, the system uses industry standard protocols for communications. In a variation, the system is integrated with the home CCN and/or the home MSC. At step 503, the system attempts to obtain information regarding the business practices of the home CCN provider by accessing at least one data store of the home CCN. For example, the system is able to construct the reference data required for billing processing. Accordingly, the system has access to rating schemes and partnerships/affiliations, for example, of the home CCN provider. At step 505, the system receives information from the data store.

The intelligent system monitors and manages the business aspects of the home CCN, by maintaining and upgrading the provider's business practices. Any change in affiliation or change in agreements between interconnect providers and the home CCN provider is automatically incorporated into the system and implemented in the accounting process at step 523. The system reviews and updates rating schemes, at step 525, to accurately assess the costs of network usage for each interconnect provider. Using the rating information, the system can evaluate roaming services, for example, and can develop an automated process for least cost routing, as shown in step 527.

The system is provided with access to subscriber accounts at step 507. The system concurrently monitors subscriber activity at step 509. Based on rating information and partnership agreements, among other factors, the system accounts for system usage based on subscriber activity at step 511. The system subsequently generates an invoice of subscriber charges at step 529 and updates the subscriber accounts to reflect the invoice at step 531. The system optionally notifies the subscriber of changes to the subscriber account at step 535.

In yet another variation, the system is able to manage the financial transaction between the provider and the subscriber. At step 533, the system requests payment from the subscriber. At step 537, the system receives payment from the subscriber, and, in turn, the system reconciles the subscriber account at step 539.

With respect to interconnect invoicing, the system communicates with interconnect providers at step 541. The system receives invoices/bills at step 543 and processes the invoices at step 545. The system accesses subscriber accounts at step 507 and monitors and reviews subscriber activity at step 509, particularly when the invoices from interconnect providers are provided in real time. The system then verifies the charges assessed by the interconnect provider at step 547 and accounts for subscriber's interconnect activity at step 511.

The system is also involved in billing and invoicing for the use of the network by non-subscribers (i.e., roaming users) of the home CCN. The system reviews the usage of the home CCN at step 513 and then assesses the usage of the home CCN to individual users and the interconnect providers of those users at step 515. The system then accounts for the system usage in view of rating and partnership information, for example, at step 517. The accounting is communicated to the pertinent interconnect providers at step 519, and the outstanding balances are resolved at step 521.

Figure 6:
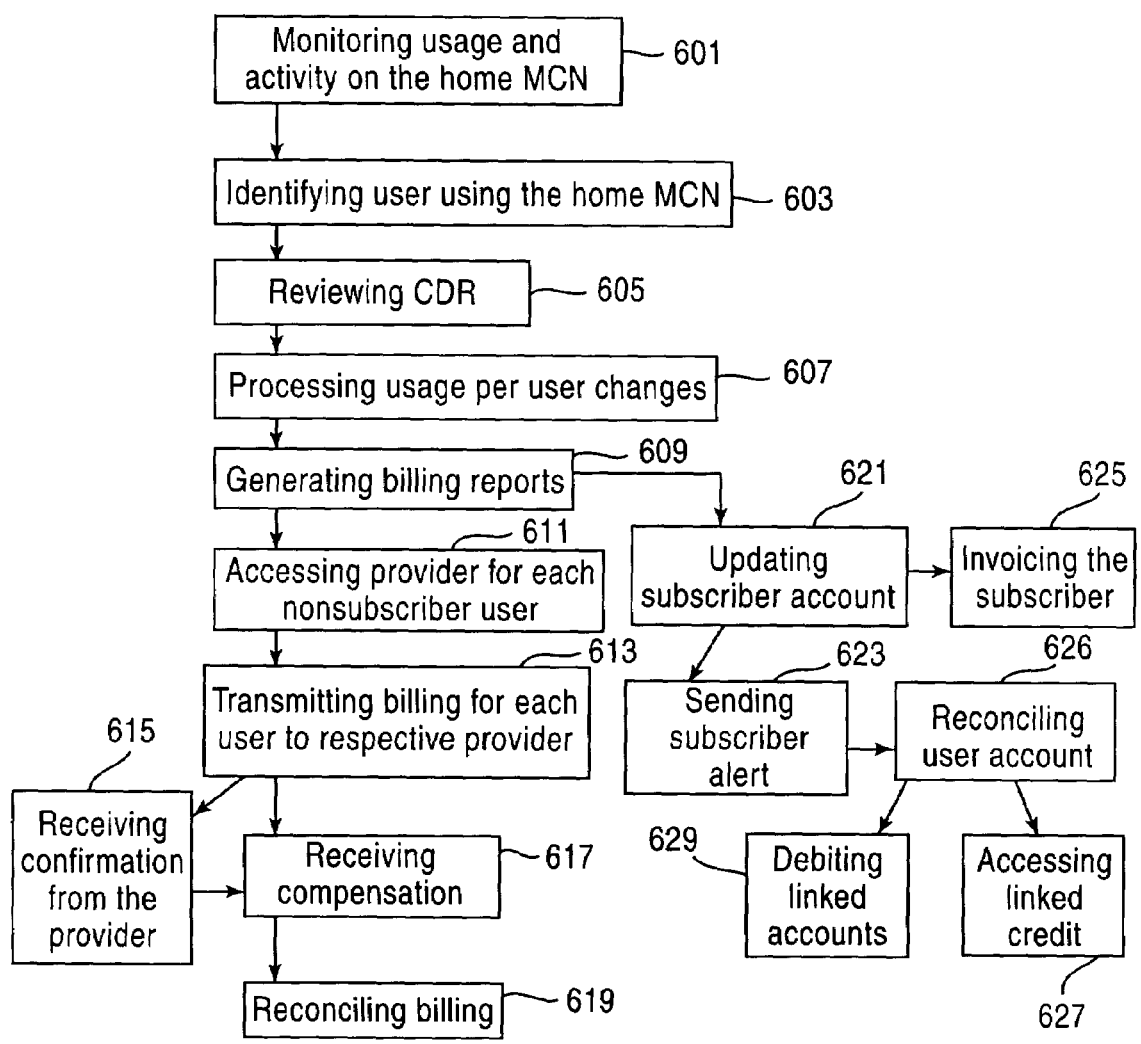
FIG. 6 presents an exemplary flow diagram of invoicing functionalities in accordance with an embodiment of the present invention.

As presented in FIG. 6, which provides an exemplary embodiment of the invoicing system of the present invention, the system is responsible for the accounting of system usage and obtaining remuneration from interconnect users and/or interconnect providers. At step 601, the system monitors the usage and activity of the home CCN. For example, the system records the duration of communications on the network. The system subsequently identifies the users responsible for usage of the home CCN at step 603. The system accesses and reviews CDRs and EDRs to generate a comprehensive report of system usage per user at step 605. Accordingly, at step 607, the system processes usage charges based on rating information and other business practices as would be understood by one skilled in the art.

The system generates billing reports for subscribers and non-subscribers (i.e., users who receiving roaming services from the home CCN provider) at step 609. For non-subscriber billing, the system identifies the responsible interconnect provider and communicates with the relevant interconnect provider responsible for usage of the home CCN at step 611. The system then transmits the invoice for each user to the respective interconnect provider at step 613. The system optionally receives confirmation of the invoice and/or bill from the interconnect provider at step 615. The system receives payment from the interconnect provider at step 617 and reconciles the payment received with the accounting records at step 619. It is understood by one skilled in the art that the invoicing and billing system of the present invention operates in real time or with some predetermined latency period as determined by each provider using the system of the present invention. The term "real time" suggests that the invoice for a roaming user's usage is transmitted to the roaming user's provider instantaneously after a CDR or EDR is generated.

The system of the present invention also monitors subscriber usage and accounts in another variation. Accordingly, once a billing report is generated at step 611, the system updates the subscriber account at step 621. The system then invoices the subscriber at step 625 and/or notifies the subscriber of the account update at step 623. The system can execute an automated reconciliation at step 625 by debiting linked subscriber accounts (e.g., checking accounts) at step 629 or access linked credit accounts at step 627, for example.

Figure 7:
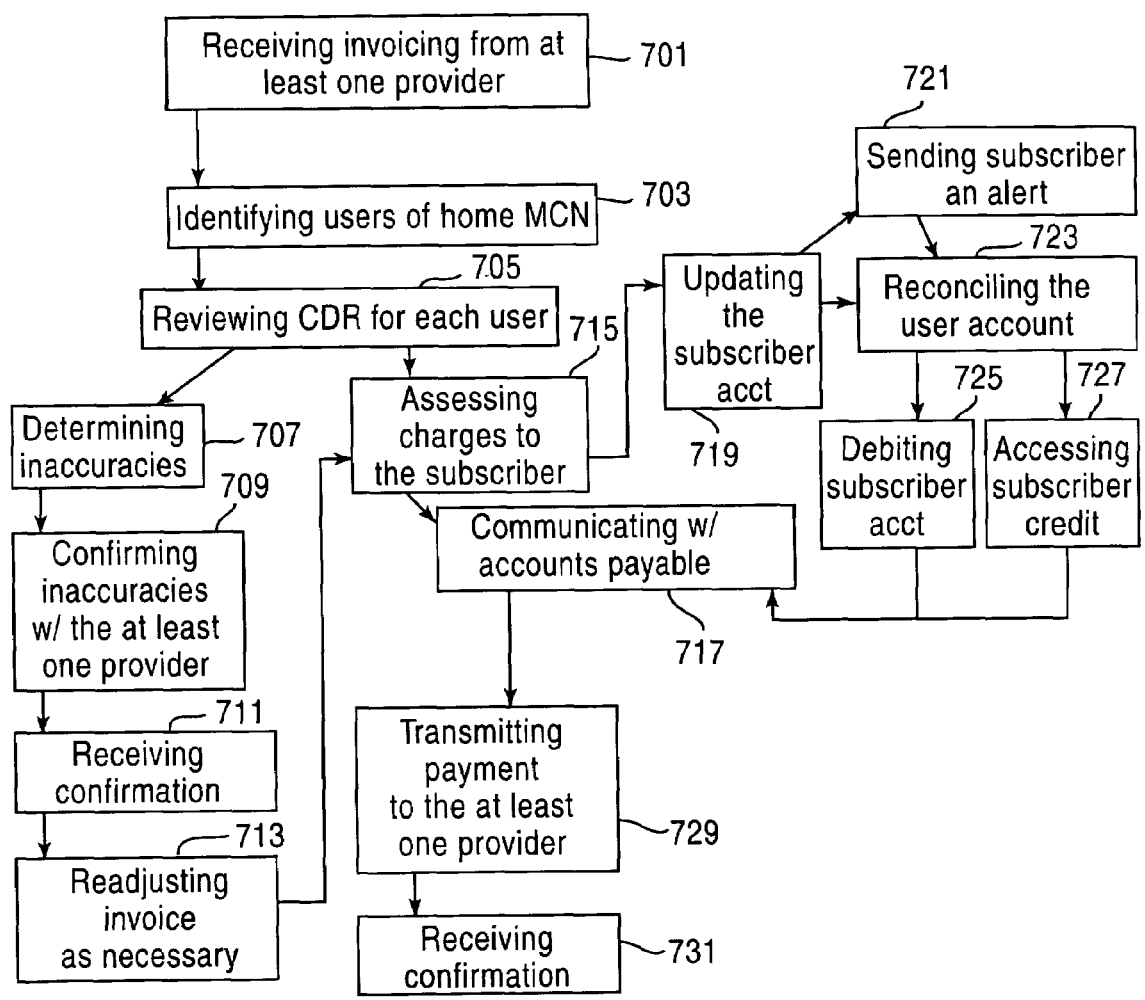
FIG. 7 presents an exemplary flow diagram of reconciliation functionalities in accordance with an embodiment of the present invention.

FIG. 7 presents an exemplary embodiment of the reconciliation process of the present invention. When a subscriber of the home CCN provider "roams," the provider carrying the roaming communication typically seeks payment for charges incurred. In this scenario, the system is able to receive an invoice and/or bill from an interconnect partner at step 701. The system processes the invoice and identifies the subscribers of the home CCN presented on the invoice at step 703. The system examines and reviews the CDR/EDR for each subscriber at step 705. If there are inaccuracies as determined by the system at step 707, the system confirms the inaccuracies at step 709 with the interconnect partner. The system receives confirmation or revised information from the interconnect partner at step 711 and, if necessary, the system readjusts the invoice at step 713. Inaccuracies that are not correctable are sent to a claim specialist, for example, for further processing.

Using the readjusted invoice from the interconnect partner, the system calculates the per user charge and assesses the charges to the subscriber at step 715. The system has the ability to update the subscriber account at step 719, and can also send the subscriber a notification (generally referred to herein as an "alert") of changes to the subscriber's account at step 721. The system can reconcile the subscriber's account at step 723 by accessing debit accounts at step 725 or credit accounts at step 727.

The system reconciles outstanding debts with interconnect partners by communicating with the accounts payable of the home CCN at step 717 and coordinating transmission of payment to the interconnect partner at step 729. The system receives confirmation of the transaction at step 731. This process is preferably conducted in real time, but the system can institute a latency period as needed.

In yet another embodiment of the present invention, the system provides complete real-time interconnect control over partner provider network traffic. Multi-layered checks are driven by configurable business logic. For example, alerts can be configured to be raised either through network management tools and technologies or to designated individuals through a SMS and/or via email and/or other communication mechanism. For instance, and for edification purposes only, suppose the number of calls routed through a particular network exceeded one million per day and only half the quantum of calls is received in a normal day. In this situation, the system, which is predetermined to provide warnings for excessive use, would raise an alarm to the designated individuals based on the first predetermined threshold, which, in this case, is excessive use of the system. In one variation, a configuration of the system allows the provider traffic to be barred upon reaching some second threshold, which is generally known and can be predetermined in the art.

The present invention consists of four major logical layers, namely: presentation layer, business logic layer, application server layer and data store layer. Each of these layers performs specific tasks in the overall system performance. The presentation layer is responsible for defining the presentation logic based on the user access device specifications. The business logic layer stores business process information/logic and applies this process logic on data/information stored and received. The application server layer acts as the control layer for the complete system and its' process flows. The data store layer provides a warehouse facility with the ability to store, retrieve and modify data.

Example Processing System Components and Functionality

Figure 3:
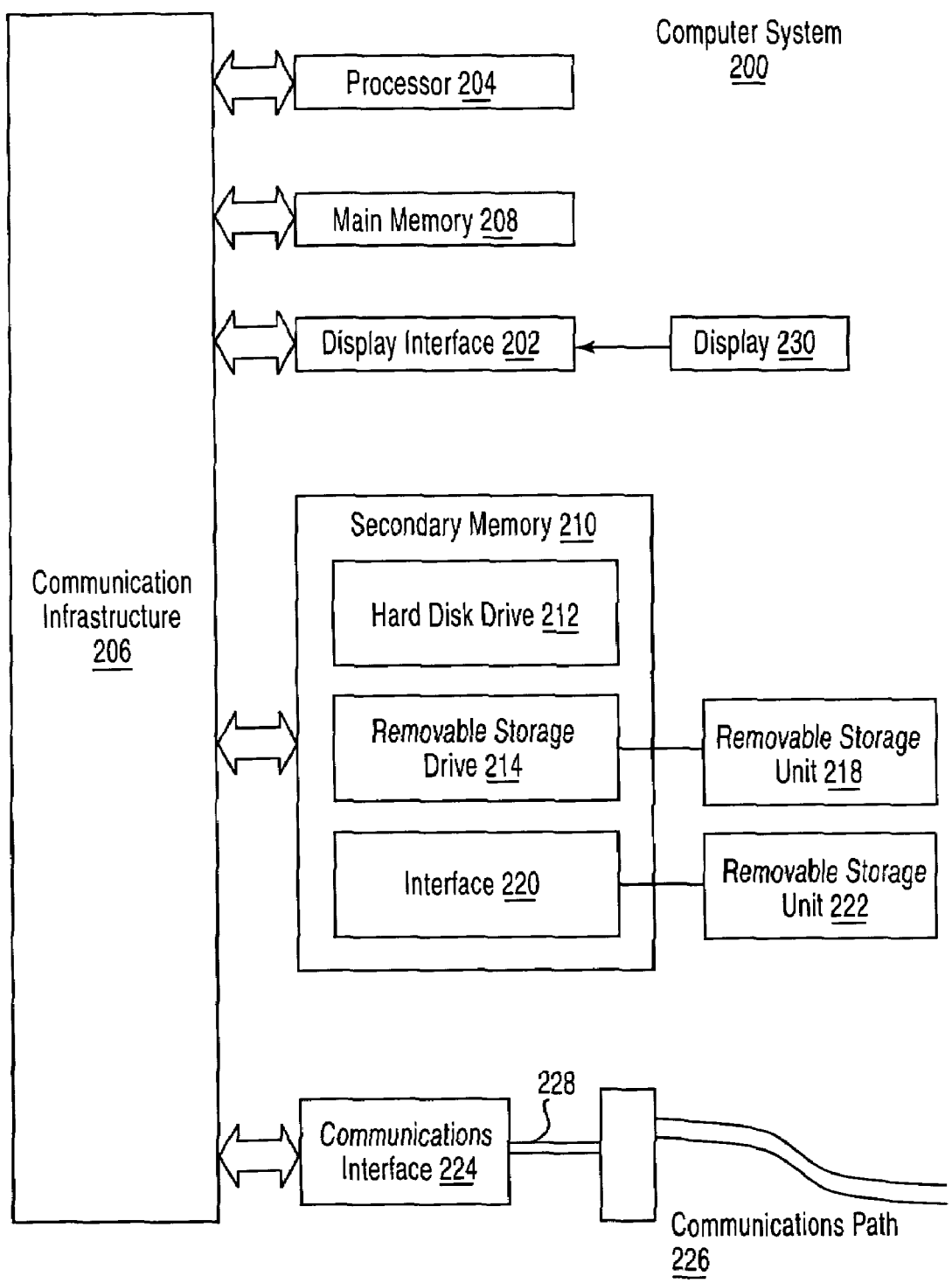
FIG. 3 presents an exemplary system diagram of various hardware components and other features in accordance with an embodiment of the present invention.

The present invention may be implemented using hardware, software, network equipment, or a combination thereof, and may be implemented in one or more computer systems or other processing systems. In one embodiment, the invention is directed toward one or more computer systems capable of carrying out the functionality described herein. An example of such a computer system is shown in FIG. 3.

Computer system 200 includes one or more processors, such as processor 204. The processor 204 is connected to a communication infrastructure 206 (e.g., a communications bus, cross-over bar or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text and other data from the communication infrastructure 206 (or from a frame buffer not shown) for display on the display unit 230. Computer system 200 also includes a main memory 208, preferably a random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by, and written to, removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212 and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212 or communications interface 224. The control logic (software), when executed by the processor 204, causes the processor 204 to perform the functions of the invention as described herein. In another embodiment, the invention is implemented primarily in hardware using, for example, hardware components, such as application-specific integrated circuits (ASICs). Implementation of the hardware state machine so as to perform the functions described herein will be apparent to persons skilled in the relevant art(s).

In yet another embodiment, the invention is implemented using a combination of both hardware and software.

Example embodiments of the present invention have now been described in accordance with the above advantages. It will be appreciated that these examples are merely illustrative of the invention. Many variations and modifications will be apparent to those skilled in the art.

What is claimed is:

1. A method of real-time billing of communications by a home provider, comprising:
   communicating with a home provider;
   accessing at least one data store of the home provider;
   receiving information regarding business practices from the at least one data store, the business practices including at least one from a group consisting of business agreements, definitions and listings of products and services, rating definitions, incentive programs, call and event data record templates, and billing and accounting principles;

generating, substantially in real time, at least one record pertaining to usage of network resources of said home provider by a subscriber of said at least one partner provider;

accounting for said usage of said network resources of said home provider by said subscriber of a partner provider substantially in real time; and using said information, and at least some information contained in said record, performing interconnect billing of said partner provider for usage of said network resources of said home provider substantially in real time.

2. A method of providing automated call routing comprising the steps of:

communicating with a home provider;

accessing at least one data store of the home provider;

receiving information regarding business practices from the at least one data store, the business practices including at least one from a group consisting of business agreements, definitions and listings of products and services, rating definitions, incentive programs, call and event data record templates, and billing and accounting principles for a plurality of partner providers;

managing business practices information, the business practices including at least one from a group consisting of business agreements, definitions and listings of products and services, rating definitions, incentive programs, call and event data record templates, and billing and accounting principles;

calculating a rating for each of said plurality of partner providers based upon at least some of said business practices information; and establishing an automated logic driven routing via at least one of said partner providers based on the rating calculation.

3. The method of claim 2, further comprising:

communicating with at least one of said partner providers;

receiving at least one invoice from one of said partner providers;

processing the at least one invoice; and assessing the at least one invoice to an identified subscriber.

4. The method of claim 3, wherein the assessing step comprises:

identifying a subscriber and/or user responsible for network activity;

analyzing a call or event data record; and generating an invoice based on the call or event data record.

5. The method of claim 3, further comprising:

notifying the subscriber of updates to an account associated with said subscriber.

6. The method of claim 5, wherein processing of the at least one invoice further comprises:

verifying the invoice;

correcting the invoice if inaccurate;

generating a corrected invoice;

transmitting the corrected invoice to said one of said partner provider;

receiving confirmation regarding the corrected invoice from said one of said partner providers; and updating an account based upon the corrected invoice.

7. The method of claim 5, further comprising:

updating an account associated with the subscriber and/or user in response to a payment received from a subscriber or a user; and optionally transmitting a confirmation to the partner provider regarding the update of the subscriber's and/or user's account.

8. A system for billing communications, the system comprising:

communicating means for communicating with the home provider;

accessing means for accessing at least one data store of the home provider;

receiving means for receiving business practices information from the at least one data store;

monitoring means for monitoring an amount of usage of network resources by a first user on a home network, said first user being a subscriber of a partner provider network;

identifying means for identifying at least the first user responsible for usage of network resources of the home provider;

accounting means for accounting the billing charges assessed to the first user substantially in real time;

generating means for generating an invoice for the billing charges substantially in real time;

transmission means for communicating the invoice to the partner provider substantially in real time;

receiving means for receiving payment for the billing charges; and reconciling means for reconciling the invoice.

9. The system of claim 8, further comprising:

managing means for managing the business practices;

rating means for rating each of a plurality of partner providers to identify a least cost partner provider; and routing means for routing a communication to said least cost partner provider.

10. A method of real-time billing of communications, the method comprising:

obtaining CDR's or EDR's in near real time from at least one partner provider based on use of a network of the partner provider by a subscriber of a home provider;

calculating the charge for use of the network of the partner provider represented by the obtained CDR or EDR on a near real-time basis;

updating, at a home network, an account balance for a subscriber of the home provider for the calculated cost of the CDR or EDR on a near real-time basis; and notifying the subscriber of the home provider, via the network of the partner provider, of the update to the account balance of the subscriber upon detection of a predetermined event.

11. A method of real-time billing of communications by a home provider, comprising:

communicating with a home provider;

accessing at least one data store of the home provider;

receiving information regarding business practices from the at least one data store;

monitoring network activity on a home network and at least one partner provider network;

accounting for network activity by a subscriber substantially in real time;

updating the subscriber account substantially in real time;

reconciling the subscriber account;

managing business practices information;

calculating a rating for each interconnect partner; and establishing an automated logic driven routing based on the rating calculation.

12. The method of claim 11, wherein business practices include at least one from a group consisting of business agreements, definitions and listings of products and services, rating definitions, incentive programs, call and event data record templates, and billing and accounting principles.

13. The method of claim 11, further comprising:
accounting for network activity by a non-subscribing user;
transmitting the accounting of the user to the partner provider;
receiving a response to the accounting from the partner provider;
processing the response; and
reconciling the user account substantially in real-time.

14. The method of claim 11, further comprising:
communicating with the interconnect partners;
receiving at least one invoice from the interconnect partners;
processing the at least one invoice; and
assessing the at least one invoice to an identified subscriber.

15. The method of claim 14, further comprising:
notifying the subscriber and/or user of updates to the account.

16. The method of claim 15, wherein processing the invoice further comprises:
verifying the invoice;
correcting the invoice if inaccurate;
generating a corrected invoice;
transmitting the corrected invoice to the interconnect partner;
receiving confirmation regarding the corrected invoice from the interconnect partner; and
updating the account with the corrected invoice.

17. The method of claim 14, wherein the accounting further comprises:
identifying the subscriber and/or user responsible for network activity;
reviewing a call or event data record for the subscriber and/or user; and
generating charges based on the call or event data record.

18. The method of claim 14, wherein reconciling further comprises:
receiving payment;
updating the subscriber account; and
optionally transmitting a confirmation to the interconnect partner regarding a update of user's account.

19. A system for billing communications, the system comprising:
communicating means for communicating with the home provider;
accessing means for accessing at least one data store of the home provider;
receiving means for receiving business practices information from the at least one data store;
monitoring means for monitoring network activity and call/event data records;
identifying means for identifying a subscriber or user responsible for network activity and call/event data records;
accounting means for accounting the billing charges assessed to the subscriber or user substantially in real time;
updating means for updating an invoice for the billing charges substantially in real time;
receiving means for receiving payment for the billing charges;
reconciling means for reconciling the invoice;
managing means for managing the business practices;
rating means for rating partner providers; and
routing means for routing subscribers to least cost partner providers.

20. A computer based method for billing communications comprising the steps of:
generating, substantially in real-time following termination of a first call involving a first roaming subscriber, first call data pertaining to use of a first network of a home provider by said first roaming subscriber that is a subscriber of a partner provider to said home provider;
generating, substantially in real time following termination of a second call involving a second roaming subscriber, second call data pertaining to use of a second network of said partner provider by said second roaming subscriber, wherein said second roaming subscriber is a subscriber of said home provider;
in response to the generation of said first call data, accessing, substantially in real time, at least one data store of said home provider containing at least rating information for a call involving a roaming subscriber of said partner provider and calculating, substantially in real-time a first amount to be charged to said partner provider for use of said home provider network by said first roaming subscriber;
obtaining, substantially in real time, said call data pertaining to said second call from a signaling unit associated with said partner provider;
accessing, substantially in real time, said at least one data store of said home provider containing at least rating information for a call involving a subscriber of said home provider roaming on said second network of said partner provider and calculating and calculating, substantially in real-time, a second amount to be charged to said home provider for use of said second network of said partner provider for use of said network of said partner provider by said subscriber of said home provider; and
updating, substantially in real-time, first and second accounts associated with said partner provider and said home provider, respectively, based on said first and second amounts.

* * * * *

UNITED STATES PATENT AND TRADEMARK OFFICE
CERTIFICATE OF CORRECTION

PATENT NO. : 7,463,878 B2
APPLICATION NO. : 11/024972
DATED : December 30, 2004
INVENTOR(S) : G. V. Kumar et al.

It is certified that error appears in the above-identified patent and that said Letters Patent is hereby corrected as shown below:

Column 13, line 59, "provider" should read --providers--.

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,463,878 B2
APPLICATION NO.   : 11/024972
DATED             : December 9, 2008
INVENTOR(S)       : G. V. Kumar et al.

It is certified that error appears in the above-identified patent and that said Letters Patent is hereby corrected as shown below:

Column 13, line 59, "provider" should read --providers--.

This certificate supersedes the Certificate of Correction issued May 26, 2009.

Signed and Sealed this

Sixteenth Day of June, 2009

JOHN DOLL
*Acting Director of the United States Patent and Trademark Office*